United States Patent Office 2,931,740

Patented Apr. 5, 1960

2,931,740

MAGNETIC ELEMENTS AND METHODS FOR MAKING THE SAME

Ubaldo Riboni, Terni, Italy, assignor to Montecatini-Societa Generale per l'Industria Mineraria e Chimica, Milan, Italy No Drawing. Application July 31, 1957
Serial No. 675,281

Claims priority, application Italy August 23, 1956

5 Claims. (Cl. 117—138.8)

This invention relates to magnetic elements for recording magnetic impulses, such as sheets, tapes, and the like.

Magnetic tapes usually consist of a flexible support having a coating of finely divided magnetic powder bonded thereto by a plastic, adhesive material. Earlier types of magnetic tapes were made by coating a dispersion of iron oxide particles in nitrocellulose on thin paper strips. More recently, improved tapes have become available in which the nitrocellulose used formerly as the adhesive for bonding the iron oxide to the support has been replaced by synthetic polymers and the paper supports have been substituted by supports made of synthetic, plastic, non-fibrous materials such as cellulose acetate, polyvinyl chloride, polyvinylidene chloride, nylon, and so on.

In general, the fundamental requirements for a satisfactory magnetic element capable of recording and reproducing sounds with high fidelity are—

(*a*) High coercitive force, low disturbance/signal ratio; reduced effect of echo, and (*b*) Tensile strength low friction moisture resistance stability against elongation to avoid sound distortion.

The properties listed under (*a*) depend essentially on the particles of magnetic material used, whereas those listed under (*b*) are determined by the support selected for the magnetic particles.

The adhesive used for bonding the particles to the support also has an influence on the characteristics and effectiveness of the tapes.

One object of the present invention is to provide magnetic tapes and the like comprising a new support for particles of magnetic material, which support meets all of the requirements which are determined by the support used in making the tape, i.e., those listed under (*b*) above.

Another object is to provide magnetic tapes in which the particles of magnetic material are bonded to the support by a new and superior adhesive.

These and other objects of the invention are accomplished by the present invention in accordance with which it is found that stretched and oriented films of polypropylene consisting prevailingly of isotactic macromolecules and which is highly crystalline at the X-rays constitute excellent supports for the magnetic particles of magnetic elements. Such supports for the magnetic particles have physical and mechanical characteristics, such as ultimate strength, yield point, flexibility and homogeneity, which are superior to those properties of most of the supports used heretofore. The magnetic tapes comprising the isotactic polypropylene supports compare very favorably with tapes comprising a nylon support or backing and have, over such prior art tapes, the unquestionable economic advantage resulting from the low cost of the polypropylene.

The isotactic polypropylene films can be obtained by melt-extrusion of the polypropylene, or by depositing solutions of the polymer or an appropriate surface and evaporating the solvent. Although the films are highly crystalline, they can be oriented by stretching in one direction, or in two orthogonal directions. It is convenient, and preferred, to stretch the isotactic polypropylene films to be used as support for the magnetic tapes in the presence of a plasticizer for the polypropylene to avoid excessive lowering of the transverse ultimate strengths. The stretched films are also preferably heated at 130° C. while they are held against retraction so that crystallization of the polymer is completed and the films are dimensionally stabilized.

The films are stretched between two rolls, the second of which is driven at a higher peripheral speed than the first, or by any other equivalent means, and for the present purposes are stretched with a stretching ratio included between 1:3 and 1:12, in a warm fluid or on a warm plate, at a temperature between 50° C. and 120° C. Optimum ultimate strengths, as high as 25 kg./mm.$^2$, have been obtained by stretching the films at 90° C. the final thickness of the films, for the present purpose of supporting the magnetic particles of magnetic elements must be about 30 microns.

The magnetic particles fixed to the support consisting of the stretched and stabilized film of isotactic polypropylene may be particles of steel, nickel or cobalt, iron magnetic alloys, iron oxides, and so on. The powdered magnetic materials must be anchored securely to the support.

We find, and this is a specific additional feature of this invention, that the relatively low molecular weight atactic polymers of propylene, which are amorphous, and preferably such polymers having an intrinsic viscosity of 0.2 to 0.4 (determined in tetralin at 135° C.) are particularly suitable for distributing the magnetic particles uniformly on the isotactic polypropylene support and for anchoring the particles to the support.

The atactic polypropylene may be mixed with other synthetic resins or adhesives, but the atactic polypropylene is always the substance which determines the adhesion of the particles to the support.

The magnetic tapes of the invention can be obtained by dispersing the magnetic particles in a carrier therefor comprising atactic polypropylene, in the presence of a solvent for the polypropylene, spreading the resulting mass on a support consisting of or comprising predominantly isotactic polypropylene, and drying the coating. A spreading device consisting of rods, rolls or knives, or any other suitable device, may be used in applying the coating of the magnetic mixture to the support. The coating on the final magnetic element must have sufficient thickness to provide satisfactory magnetic power and, also, must be smooth and uniform. The coated and dried tapes may be subjected to smoothing operations, such as calendering, for improving the recording and reproduction characteristics. Compositions comprising, by weight, from 60% to 85% of the magnetic powder, from 15% to 40% of the atactic polypropylene, and the solvent such as chloroform, are suitable for use.

According to another embodiment of the invention, very satisfactory magnetic elements in the form of wires, tapes or sheets are obtained by mixing the particles of magnetic material with a melt consisting of isotactic polypropylene and extruding the mixture through a conventional shaping device to obtain the magnetic element in the desired physical form.

We find, also, that atactic polypropylene is adhesive to films of synthetic resins and film-forming materials other than isotactic polypropylene, such as films of polyamides, polyethylene terephthalates, polyethylene, polyvinyl chloride and cellulose acetate and can be used to anchor the magnetic particles to supports made from such materials. This invention therefore contemplates new magnetic elements comprising a base or support of materials of the type mentioned and to which the magnetic particles are anchored by atactic polypropylene or a mixture comprising atactic polypropylene. Such tapes have good properties, the disadvantages thereof being those which are inherent in the support and which are due to the characteristics of the particular resin or other material from which the support is made.

The following examples are given to illustrate the invention and are not intended as limiting.

*Example 1*

A film formed from crystalline (isotactic) polypropylene having an intrinsic viscosity of 1.2 (determined in tetralin at 135° C.) was plasticized by dipping it for 60 seconds into a petroleum fraction boiling between 180° C. and 200° C. and maintained at 70° C. The film was then successively stretched in water at 80° C. with a stretching ratio of 1:6, stabilized at 130° C., and cut into tapes having the following dimensions: thickness—30 microns; width—6 mm.; length—10 m. The ultimate strength of the tapes was 15.8 kg./mm.$^2$.

A magnetic composition consisting of, by weight, 100 parts chloroform, 5 parts atactic polypropylene, and 15 parts finely divided $Fe_2O_3$ $\gamma$ and which had been homogenized in a ball mill for 12 hours, was spread on the tapes, using a knife spreader.

The coated tape was dried, wound on a bobbin, and mounted on a sound recorder. It was determined that the tape gave a faithful reproduction of the voice and that no distortion or modification occurred when operating in a wide temperature range (tests were carried out at temperatures between −10° C. and 60° C.) at varying moisture values and even after immersion in water for 15 days. No elastic modification of the tape occurred.

*Example 2*

A crystalline (isotactic) polypropylene having an intrinsic viscosity of 0.9, was mixed with 5% by weight of paraffin and the mixture was homogenized for one-half hour in a mixer. The mixture was then extruded to obtain a film which was stretched longitudinally in water at 90° C. with a stretching ratio of 1:5. The film was stabilized at 130° C. and cut into tapes having the dimensions: thickness—35 microns; width—6 mm.; length—10 m. The ultimate strength of the tapes was 15.6 kg./mm.$^2$.

The tapes were provided with a magnetic coating by spreading thereon, by means of a roll spreader, a composition consisting of, by weight, 100 parts chloroform, 8 parts atactic polypropylene having an intrinsic viscosity 0.29 and 30 parts $Fe_2O_3$ $\gamma$, and which had been previously homogenized in a ball mill for 12 hours. The coated tapes were dried, wound upon a bobbin, and mounted on a sound recorder. Good fidelity of the voice recording and reproduction were obtained.

*Example 3*

Molten crystalline (isotactic) polypropylene having an intrinsic viscosity of 1.5 (tetralin at 135° C.) was mixed with finely divided $Fe_2O_3$ $\gamma$ in the ratio of 90 parts of the isotactic polypropylene to 10 parts of the $Fe_2O_3$ $\gamma$.

The molten mass was extruded through an extruder to obtain a film which was stretched in water at 90° C. with a stretching ratio of 1:6, stabilized at 130° C. and cut into tapes 30 microns thick, 6 mm. wide, and 10 m. long.

The thus prepared tapes were wound up on a bobbin and mounted on a tape recorder. Also in this case a faithful voice recording was obtained.

As has been described by G. Natta and his co-workers, a polymerizate comprising a mixture of propylene polymers made up of the isotactic macromolecules and propylene polymers made up of the atactic macromolecules can be obtained by polymerizing propylene with the aid of a catalyst prepared from a compound, such as a high valency halide, of a transition metal of the 4th to 6th groups of the periodic table such as titanium, zirconium, vanadium, etc., and a metallorganic compound of a metal of the 1st to 3rd groups of the periodic table, i.e., a metal alkyl such as trialkyl aluminum, the polymerization being carried out in an inert hydrocarbon solvent, at e.g., 50° C. to 120° C., and under atmospheric or only slightly increased pressure. The polymers made up of the different types of macromolecules can be separated from the crude polymerizate by means of selective solvents. Thus, the polymerizate can be extracted successively with hot acetone, ether and n-heptane to isolate successively low molecular weight oily polymers, atactic polymers, and partially crystalline polymers and leave a residue consisting of highly crystalline polyproplyene consisting prevailingly of the isotactic macromolecules.

As has also been described by G. Natta and his group, it is possible to orient the polymerization of propylene to the direct production of crude polymerizates consisting prevailingly of the isotactic macromolecules or to the production of crude polymerizates consisting prevailingly of atactic macromolecules, by selection of the specific catalyst used. If the catalyst is prepared from the metal alkyl and crystalline, low-valency compound of the transition metal such as titanium trichloride and is difficultly dispersible in the hydrocarbon solvent used as the polymerization medium, the product obtained directly consists prevailingly of the isotactic polypropylene. On the other hand, if the catalyst is prepared from the metal alkyl and a high valency compound of the transition metal such as titanium tetrachloride and is soluble or readily dispersible in the hydrocarbon solvent, the product obtained directly consists prevailingly of atactic polypropylene.

The isotactic polypropylene used to prepare the support for the present magnetic tapes may be the residue of the n-heptane extraction of the crude polymerizate or it may be the polymer obtained directly using the selected catalyst. In some instances, if the amount of atactic polypropylene present is not above 30%, the residue of the ether extraction may be used in making the support.

The atactic polypropylene may be the ether extract of the crude polymerizate or may be the polymer obtained directly.

The term "isotactic" has been adopted by Natta to identify the particular stereoregular structure of the macromolecules making up the new crystalline polymers of the alphaolefines $CH_2{=}CHR$, where R is a hydrocarbon radical, produced by him and his group. These "isotactic" polymers are linear, regular head-to-tail polymers consisting substantially of macromolecules in which the tertiary carbon atoms of the main chain have substantially the same steric configuration, and the main chain of which macromolecules, if fully extended in a plane, shows substantially all of the R($CH_3$— for propylene) groups on one side of the plane and all of the hydrogen atoms bound to the tertiary carbon atoms on the opposite side.

The atactic polymers (so-called by Natta) are non-crystalline and are linear, regular head-to-tail polymers consisting substantially of macromolecules in which tertiary asymmetric carbon atoms of the main chain having the same steric configuration have substantially a statistical distribution, and the main chain of which macromolecules, if fully extended in a plane, shows the R($CH_3$—) groups and the hydrogen atoms bound to the tertiary carbon atoms substantially in random distribution on the two sides of the plane.

The isotactic polypropylene used as the support in the new magnetic elements may have an intrinsic viscosity between 0.3 and 2 determined in tetralin at 135° C.

Various changes and modifications may be made in practicing the invention. Since such changes in details may be made without departing from the spirit of the invention, it is intended to include any and all variations which may be apparent to those skilled in the art within the scope of the appended claims.

What is claimed is:

1. As a new article of manufacture, a magnetic element consisting essentially of a thin, flexible, non-magnetic support in the form of a stretched, dimensionally stabilized film of crystalline polypropylene consisting prevailingly of isotactic macromolecules and having an intrinsic viscosity of about 0.3 to about 2.0 determined in tetralin at 135° C., a finely divided magnetic material uniformly distributed on the support, and an adhesive binder which anchors the magnetic material to the support and consists essentially of an amorphous polypropylene made up substantially of atactic macromolecules and having an intrinsic viscosity between about 0.2 and 0.4 determined in tetralin at 135° C., said element having the capacity to record and reproduce sound with high fidelity, and being resistant to distortion or elastic modification under widely varying temperature and humidity conditions.

2. As a new article of manufacture, a magnetic tape consisting essentially of a flexible, non-magnetic support in the form of a stretched, dimensionally stabilized film of a crystalline polypropylene consisting prevailingly of isotactic macromolecules and having an intrinsic viscosity of about 0.3 to about 2.0 determined in tetralin at 135° C., said film having a thickness of about 30 microns, a finely divided magnetic material uniformly distributed on the support, and an adhesive binder which anchors the magnetic material to the support and consists of an amorphous polypropylene made up substantially of atactic macromolecules and having an intrinsic viscosity of about 0.2 to about 0.4 determined in tetralin at 135° C., said tape having the capacity to record and reproduce sounds with high fidelity, and being resistant to distortion or elastic modification under widely varying temperature and humidity conditions.

3. As a new article of manufacture, a magnetic tape consisting essentially of a flexible, non-magnetic support in the form of a film of a crystalline polypropylene consisting prevailingly of isotactic macromolecules and having an intrinsic viscosity of about 0.3 to about 2.0 determined in tetralin at 135° C., said film having a thickness of about 30 microns, and a magnetic coating uniformly distributed on and firmly anchored to the support and consisting essentially of from 60% to 85% by weight of a finely divided magnetic material and from 15% to 40% of an adhesive binder consisting essentially of an amorphous polypropylene made up substantially of atactic macromolecules and having an intrinsic viscosity of about 0.2 to about 0.4 determined in tetralin at 135° C., said tape having the capacity to record and reproduce sound with high fidelity, and being resistant to distortion or elastic modification at temperatures varying between —10° C. and 60° C., and under varying conditions of exposure to moisture.

4. The method of making heat and moisture-resistant magnetic elements which comprises spreading a composition consisting essentially of an organic volatile solvent, particulate magnetic material, and an amorphous polypropylene made up substantially of atactic macromolecules and having an intrinsic viscosity of about 0.2 to about 0.4 determined in tetralin at 135° C., uniformly on a thin, flexible, stretched and dimensionally stabilized non-magnetic supporting film of a crystalline polypropylene consisting prevailingly of isotactic macromolecules and having an intrinsic viscosity of about 0.3 to about 2.0 determined in tetralin at 135° C., and evaporating the organic solvent to provide the supporting film with a uniform magnetic coating having the capacity to record and reproduce sound with high fidelity, the magnetic particles of which are anchored to the supporting film by the amorphous polypropylene.

5. The method of making a heat and moisture-resistant magnetic tape which comprises spreading a composition consisting essentially of an organic volatile solvent, from 60% to 85% by weight of a particulate magnetic material, and from 15% to 40% of an amorphous polypropylene made up substantially of atactic macromolecules and having an intrinsic viscosity of about 0.2 to about 0.4 determined in tetralin at 135° C., uniformly on a flexible, non-magnetic supporting film having a thickness of about 30 microns and made of a crystalline polypropylene consisting prevailingly of isotactic macromolecules and having an intrinsic viscosity of about 0.3 to about 2.0 determined in tetralin at 135° C., and evaporating the organic solvent to provide the supporting film with a magnetic coating of a thickness consonant with high fidelity sound recording and reproduction and the magnetic particles of which are firmly bonded to the supporting film by the amorphous polypropylene.

References Cited in the file of this patent

UNITED STATES PATENTS

| | | |
|---|---|---|
| 2,566,441 | Camras | Sept. 4, 1951 |
| 2,654,681 | Lueck | Oct. 6, 1953 |
| 2,774,327 | Saint-Hilaire | Dec. 18, 1956 |
| 2,819,186 | Franck | Jan. 7, 1958 |

FOREIGN PATENTS

| | | |
|---|---|---|
| 538,782 | Belgium | Dec. 6, 1955 |